US012057044B2

(12) United States Patent
Shi et al.

(10) Patent No.: US 12,057,044 B2
(45) Date of Patent: Aug. 6, 2024

(54) IMAGE DISPLAY METHOD AND DEVICE, STORAGE MEDIUM, ELECTRONIC DEVICE

(71) Applicants: Beijing BOE Display Technology Co., Ltd., Beijing (CN); BOE Technology Group Co., Ltd., Beijing (CN)

(72) Inventors: Tiankuo Shi, Beijing (CN); Xiangjun Peng, Beijing (CN); Shuo Zhang, Beijing (CN); Yan Sun, Beijing (CN); Xiaomang Zhang, Beijing (CN); Xin Duan, Beijing (CN); Wei Sun, Beijing (CN); Shaoru Zhang, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/913,456

(22) PCT Filed: Sep. 15, 2021

(86) PCT No.: PCT/CN2021/118596
§ 371 (c)(1),
(2) Date: Sep. 22, 2022

(87) PCT Pub. No.: WO2023/039765
PCT Pub. Date: Mar. 23, 2023

(65) Prior Publication Data
US 2024/0221566 A1 Jul. 4, 2024

(51) Int. Cl.
*G09G 3/20* (2006.01)

(52) U.S. Cl.
CPC ......... *G09G 3/20* (2013.01); *G09G 2300/026* (2013.01); *G09G 2320/0276* (2013.01); *G09G 2360/16* (2013.01)

(58) Field of Classification Search
CPC ............... G09G 3/20; G09G 2300/026; G09G 2320/0276; G09G 2360/16
See application file for complete search history.

(56) References Cited

U.S. PATENT DOCUMENTS

2021/0201836 A1* 7/2021 Nakanishi ............ G09G 3/3648
2022/0208135 A1* 6/2022 Wu ...................... G09G 3/2007

* cited by examiner

*Primary Examiner* — Brent D Castiaux
(74) *Attorney, Agent, or Firm* — XSENSUS LLP

(57) ABSTRACT

An image display method includes: obtaining image data of a target image, and obtaining an initial sampling value of a first screen according to the image data, wherein the initial sampling value includes region sampling values of at least two target regions in the first screen, and the region sampling values include a previous region correction value and a current region sampling value; correcting the current region sampling value in a target region sampling value, based on a mapping relationship between the previous region correction value and the target region sampling value, to obtain first data; and determining second data corresponding to a second screen according to the first data, to realize displaying of the target image in a stacked screen according to the first data and the second data, wherein the stacked screen is formed by the first screen and the second screen in an overlapped manner.

20 Claims, 10 Drawing Sheets

IMAGE DISPLAY METHOD AND DEVICE, STORAGE MEDIUM, ELECTRONIC DEVICE

CROSS REFERENCE

The present application is based upon International Application No. PCT/CN2021/118596, filed on Sep. 15, 2021, and the entire contents thereof are incorporated herein by reference.

TECHNICAL FIELD

The present disclosure relates to the field of image technology, and in particular. to an image display method, an image display device, a computer-readable storage medium, and an electronic device.

BACKGROUND

With the development of image technology, images can be displayed not only in one screen, but also in a stacked screen with two upper and lower screens.

In the related art, the display of the image in the stacked screen is realized by splitting the image data into two parts of data, and displaying the first part of the data in one screen of the stacked screen and displaying the second part of the data in the other screen of the stacked screen.

It should be noted that, information disclosed in the above background portion is provided only for better understanding of the background of the present disclosure, and thus it may contain information that does not form the prior art known by those ordinary skilled in the art.

SUMMARY

The present disclosure provides a picture display method, a picture display device, a computer-readable storage medium, and an electronic device.

The present disclosure provides an image display method, including:

- obtaining image data of a target image, and obtaining an initial sampling value of a first screen according to the image data, wherein the initial sampling value includes region sampling values of at least two target regions in the first screen, and the region sampling values include a previous region correction value and a current region sampling value;
- correcting the current region sampling value in a target region sampling value, based on a mapping relationship between the previous region correction value and the target region sampling value, to obtain first data; and
- determining second data corresponding to a second screen according to the first data, to realize displaying of the target image in a stacked screen according to the first data and the second data, wherein the stacked screen is formed by the first screen and the second screen in an overlapped manner.

In an exemplarily embodiment of the present disclosure, the target region includes at least two row regions, and the obtaining the initial sampling value of the first screen according to the image data includes:

- determining row image data corresponding to a preset number of the row regions from the image data, and calculating the row image data to obtain a first calculation result and a second calculation result;
- obtaining a previous row correction value corresponding to the row region and a current row sampling value corresponding to the row region according to the first calculation result and the second calculation result, wherein a row region sampling value is formed by the previous row correction value and the current row sampling value; and
- comparing data on a same bit of the row region sampling value to obtain a comparison result, and obtaining the region sampling value of the target region in the first screen according to the comparison result.

In an exemplarily embodiment of the present disclosure, the obtaining the previous row correction value corresponding to the row region and the current row sampling value corresponding to the row region according to the first calculation result and the second calculation result includes:

- determining a first calculation relationship amongst the first calculation result, a first weight corresponding to the first calculation result, the second calculation result, a second weight corresponding to the second calculation result, a current row sampling weight, and the current row sampling value, and determining a second calculation relationship amongst the first calculation result, the second calculation result, the first weight, the second weight, a current row correction weight, and the previous row correction value; and
- calculating the first calculation result and the second calculation result based on the first calculation relationship to obtain the current row sampling value corresponding to the row region, and calculating the first calculation result and the second calculation result based on the second calculation relationship to obtain the previous row correction value corresponding to the row region.

In an exemplarily embodiment of the present disclosure, the method further includes:

- obtaining a row sampling threshold, and if data occupancy of the previous row correction value is greater than the row sampling threshold, performing truncation processing on the previous row correction value to obtain a first truncated result, to update the previous row correction value according to the first truncated result; and
- if data occupancy of the current row sampling value is greater than the row sampling threshold, performing truncation processing on the current row sampling value to obtain a second truncated result, to update the current row sampling value according to the second truncated result.

In an exemplarily embodiment of the present disclosure, the correcting the current region sampling value in the target region sampling value to obtain the first data includes:

- determining the current region sampling value in the target region sampling value, and determining the previous region correction value having the mapping relationship with the target region sampling value; and
- determining a correction calculation relationship between the previous region correction value and the current region sampling value, and correcting the current region sampling value based on the correction calculation relationship to obtain the first data.

In an exemplarily embodiment of the present disclosure, the determining the previous region correction value having the mapping relationship with the target region sampling value includes:

- determining a region identifier corresponding to the target region sampling value, and determining an adjacent region identifier that has a region-adjacent relationship with the region identifier according to a storage order of the region identifier; and determining the region sampling value corresponding to the adjacent region identifier, and determining the previous region correction value from the region sampling value.

In an exemplarily embodiment of the present disclosure, the obtaining the region sampling value of the target region in the first screen according to the comparison result includes:

determining target data corresponding to different bits according to the comparison result, and arranging the target data according to data positions corresponding to the different bits to obtain the region sampling value of the target region in the first screen.

The present disclosure provides an image display device, including:

a calculating module, configured to obtain image data of a target image, and obtain an initial sampling value of a first screen according to the image data, wherein the initial sampling value includes region sampling values of at least two target regions in the first screen, and the region sampling values include a previous region correction value and a current region sampling value;

a correction module configured to correct the current region sampling value in a target region sampling value, based on a mapping relationship between the previous region correction value and the target region sampling value, to obtain first data; and a displaying module configured to determine second data corresponding to a second screen according to the first data, to realize displaying of the target image in a stacked screen by displaying the first data on the first screen and displaying the second data in the second screen, wherein the stacked screen is formed by the first screen and the second screen in an overlapped manner.

The present disclosure provides a computer-readable storage medium on which a computer program is stored, wherein when the computer program is executed by a processor, any one of the above the image display method is implemented.

The present disclosure provides an electronic device, including: a processor; and a memory configured to store executable instructions for the processor, wherein the processor is configured to perform any one of the above image display method by executing the executable instructions.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and together with the description serve to explain the principles of the disclosure. Obviously, the drawings in the following description are only some embodiments of the present disclosure, and for those of ordinary skill in the art, other drawings can also be obtained from these drawings without creative efforts.

DETAILED DESCRIPTION

Figure 1:
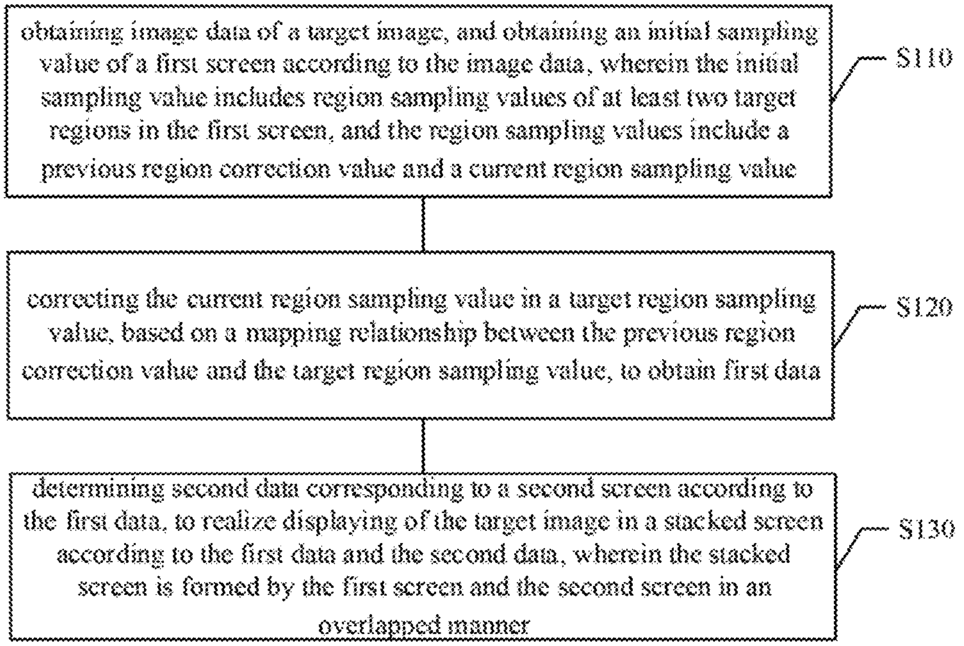
FIG. 1 schematically shows a schematic flowchart of an image display method in an embodiment of the present disclosure.

Example embodiments will now be described more fully with reference to the accompanying drawings. Example embodiments, however, can be embodied in various forms and should not be construed as limited to the examples set forth herein; rather, these embodiments are provided so that this disclosure will be thorough and complete, and will fully convey the concept of example embodiments to those skilled in the art. The described features, structures, or characteristics may be combined in any suitable manner in one or more embodiments. In the following description, numerous specific details are provided in order to give a thorough understanding of the embodiments of the present disclosure. However, those skilled in the art will appreciate that the technical solutions of the present disclosure may be practiced without one or more of the specific details, or other methods, components, devices, steps, etc. may be employed. In other instances, well-known solutions have not been shown or described in detail to avoid obscuring aspects of the present disclosure.

The terms "a", "an", "the" and "said" are used in this specification to indicate the presence of one or more elements/components/etc.; the terms "include" and "have" are used to indicate open-ended inclusive and means that additional elements/components/etc. may be present in addition to the listed elements/components/etc.; and the terms "first" and "second" etc. are used only as labels, not for limiting the number of its objects.

Furthermore, the drawings are merely schematic illustrations of the present disclosure and are not necessarily drawn to scale. The same reference numerals in the drawings denote the same or similar parts, and thus their repeated descriptions will be omitted. Some of the block diagrams shown in the figures are functional entities that do not necessarily correspond to physically or logically separate entities.

In view of the problems existing in the related art, the present disclosure proposes an image display method. FIG. 1 shows a schematic flowchart of an image display method. As shown in FIG. 1, the image display method at least includes the following steps.

Step S110, obtaining image data of a target image, and obtaining an initial sampling value of a first screen according to the image data, wherein the initial sampling value includes region sampling values of at least two target regions in the first screen, and the region sampling values include a previous region correction value and a current region sampling value.

Step S120, correcting the current region sampling value in a target region sampling value, based on a mapping relationship between the previous region correction value and the target region sampling value, to obtain first data.

Step S130, determining second data corresponding to a second screen according to the first data, to realize displaying of the target image in a stacked screen according to the first data and the second data, wherein the stacked screen is formed by the first screen and the second screen in an overlapped manner.

In the method and device provided by the exemplary embodiments of the present disclosure, according to the mapping relationship between the previous region correction value and the target region sampling value, the current region sampling value in the target region sampling value is corrected, avoiding the problem existing in the related art that due to the irregular distribution of pixels on the first screen, the image edge appears jagged during the image display process, which improves the image display effect and further improves the user's experience of viewing the image.

Hereinafter, each step of the image display method will be described in detail.

In step S110, image data of a target image is obtained, and an initial sampling value of a first screen is obtained according to the image data, wherein the initial sampling value includes region sampling values of at least two target regions in the first screen, and the region sampling values include a previous region correction value and a current region sampling value.

In the exemplary embodiment of the present disclosure, the target image is the image displayed on the staked screen, and correspondingly, the image data is the color data of the target image. Specifically, the image data may be decimal data, or may be binary data, or may also be hexadecimal data, which is not particularly limited in this exemplary embodiment.

The stacked screen is a screen formed by two upper and lower screens overlapping. Specifically, the stacked screen can be disposed on a mobile terminal, a computer, or any required device. The exemplary embodiment does not make any special limitation on this. In the embodiment, the lower screen is the first screen, and the upper screen is the second screen. Based on this, since there are two screens in the stacked screen, the image data is split into two pieces of data, wherein the first data is displayed on the first screen and the second data is displayed on the second screen, so that the target image is displayed on the stacked screen. The initial sampling value refers to the initial value of the first data.

It should be noted that the first screen can be divided into at least two target regions in the vertical direction. Based on this, the initial sampling values include the region sampling values of at least two target regions, and the region sampling values specifically include two values, one is the previous region correction value, and the other is the current region sampling value. The previous region correction value is used to correct the current region sampling value of the previous target region in the vertical direction of the current target region. The current region sampling value refers to the regional initial sampling value of the current target region.

Figure 2:
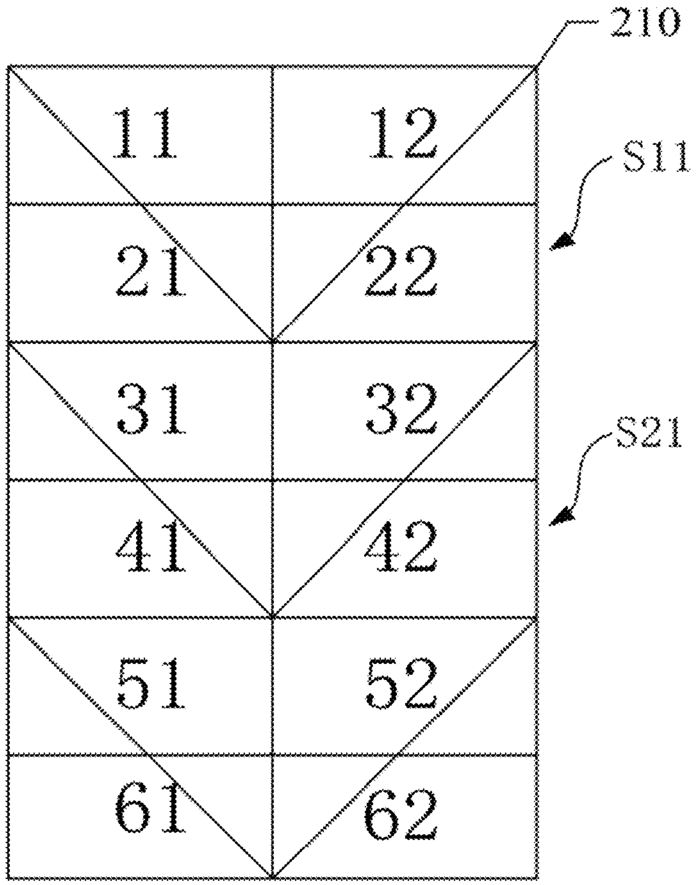
FIG. 2 schematically shows a schematic structural diagram of a first screen in a stacked screen in an embodiment of the present disclosure.

For example, FIG. 2 shows a schematic diagram of the structure of the first screen in the stacked screen, as described in FIG. 2, the screen 210 is the first screen with a V-shaped structure in the stacked screen. 12. Generally, point 11, point 12, point 21, point 22, point 31, point 32, point 41, point 42, point 51, point 52, point 61, point 62 each correspond to a pixel point in the target image. The region formed by the point 11, point 12, point 21, point 22, point 31, point 32, point 41 and point 42 is the first target region S11 in the first screen, and the region formed by the point 31, point 32, point 41, point 42, point 51, point 52, point 61 and point 62 is the second target region S21 in the first screen.

Figure 3:
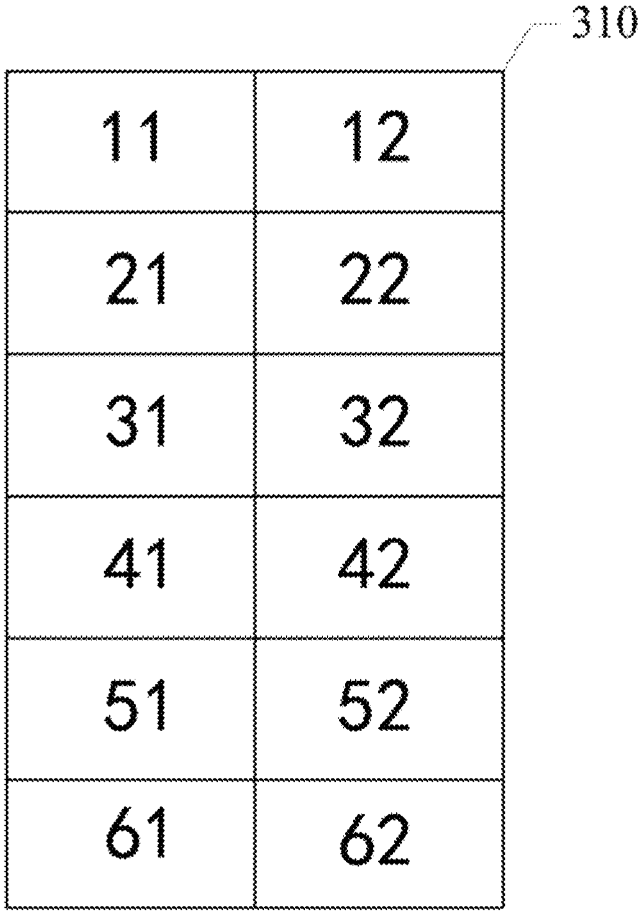
FIG. 3 schematically shows a schematic structural diagram of a second screen in a stacked screen in an embodiment of the present disclosure.

FIG. 3 shows a schematic structural diagram of the second screen in the stacked screen. As shown in FIG. 3, the screen 310 is the second screen in the stacked screen. Generally, point 11, point 12, point 21, point 22, Point 31, point 32, point 41, point 42, point 51, point 52, point 61, point 62 each correspond to a pixel point in the target image.

Figure 4:
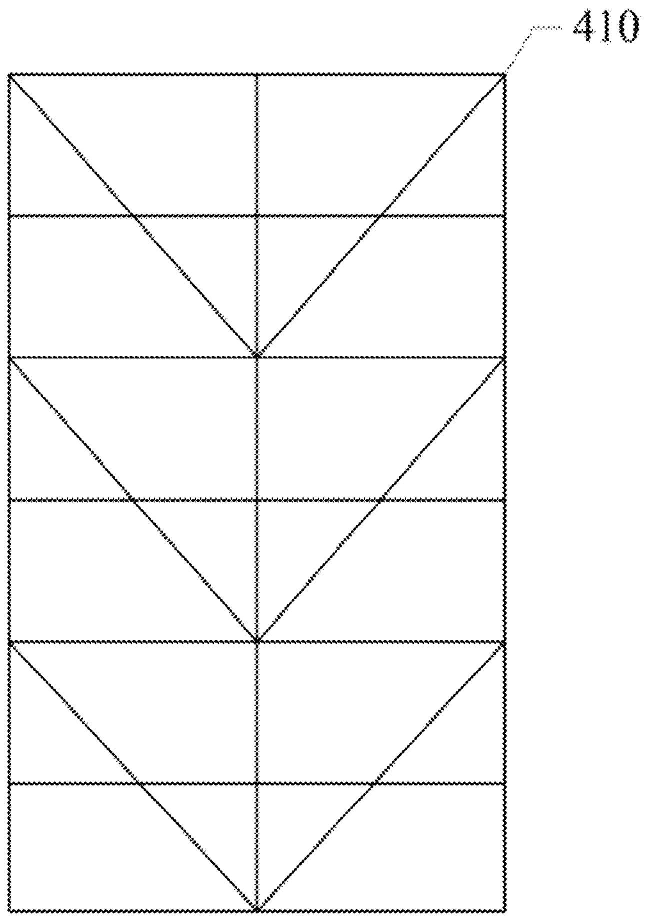
FIG. 4 schematically shows a top-view structural schematic diagram of a stacked screen in an embodiment of the present disclosure.

FIG. 4 shows a schematic top view structure of the stacked screen, as shown in FIG. 4, the screen 410 is a stacked screen.

Figure 5:
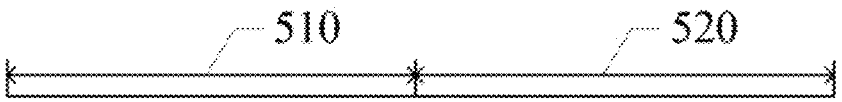
FIG. 5 schematically shows the data storage structure of the region sampling value in the embodiment of the present disclosure.

Based on this, after acquiring the image data of the target image A, the initial sampling value of the first screen 210 as shown in FIG. 2 can be obtained according to the image data, and the initial sampling value includes the region sampling value of the target region S11 and the region sampling value of the target region S21 shown in FIG. 2. Specifically, FIG. 5 shows the data storage structure of the region sampling value, as shown in FIG. 5, the current region sampling value in the region sampling value is stored at the data location 510, and the previous region correction value in the region sampling value is stored at the data location 520.

Figure 6:
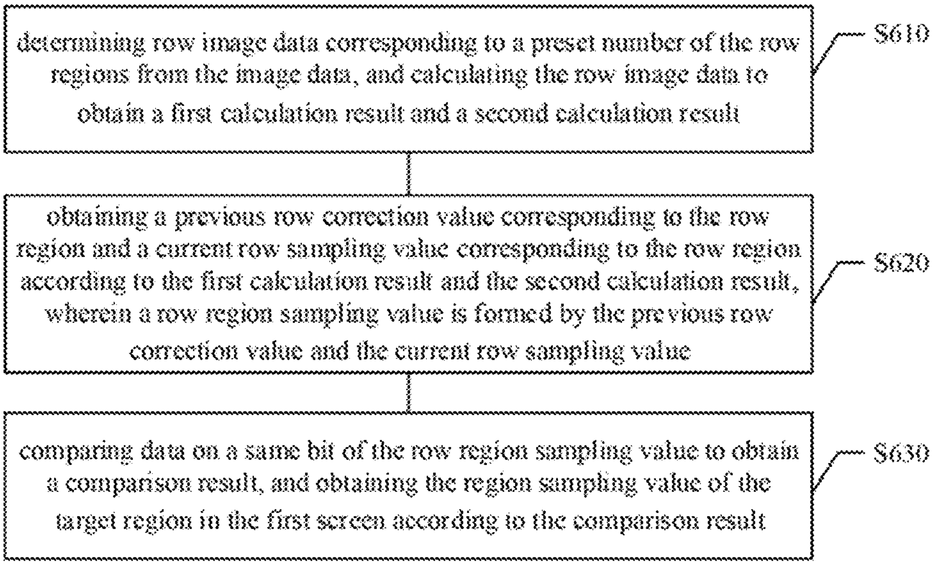
FIG. 6 schematically shows a schematic flowchart of obtaining an initial sampling value of a first screen in an embodiment of the present disclosure.

In an optional embodiment, FIG. 6 shows a schematic flowchart of obtaining the initial sampling value of the first screen in the image display method, and the target region includes at least two row regions. As shown in FIG. 6, the method includes at least the following steps: in step S610, the row image data corresponding to preset number of row regions is determined from the image data, and the row image data is calculated to obtain the first calculation result and the second calculation result.

The target region can be divided into multiple row regions, and the row image data refers to the image data corresponding to the row region in the image data. After the row image data is obtained, the row image data needs to be calculated to obtain the two calculation results, which are the first calculation result and the second calculation result, respectively.

For example, as shown in FIG. 2, there are four row regions in target region S11, namely a row region X1 including points 11 and 12, a row region X2 including points 21 and 22, a row region X3 including points 31 and point 32, and a row region X4 including points 41 and 42. If the preset number is 2, only the row image data corresponding to two row regions of the target region S11 are obtained from the image data. Specifically, the two pieces of row image data include row image data 1 corresponding to the row region X1 and row image data 2 corresponding to the row region X2.

Based on this, the row image data corresponding to the first row region includes the image data m11 corresponding to point 11 and the image data m12 corresponding to point 12, and the row image data corresponding to the second row region includes the image data m21 corresponding to point 21 and the image data m22 corresponding to the point 22.

Find the maximum value of m11 and m12 to get the first calculation result, and find the average value of m11 and m12 to get the second calculation result. Similarly, m21 and m22 can be calculated to obtain the first calculation result and the second calculation result corresponding to the second row region.

After the first calculation result and the second calculation result are obtained, the data occupancy amount of the first calculation result and the second calculation result can also be limited. Specifically, a threshold value of the data occupancy amount of the calculation result is set, if the first calculation result is greater than the data occupancy threshold, the data occupancy of the first calculation result is limited within the data occupancy threshold, and if the second calculation result is greater than the data occupancy threshold, the data occupancy of the second calculation result is limited within the data occupancy threshold.

In step S620, according to the first calculation result and the second calculation result, the previous row correction value corresponding to the row region and the current row sampling value corresponding to the row region are obtained, wherein the previous row correction value and the current row sampling value form a row region sampling value.

The previous row correction value corresponding to the row region and the current row sampling value corresponding to the row region may be obtained according to the first calculation result and the second calculation result.

For example, find the maximum value of m11 and m12 to get the first calculation result, and find the average value of m11 and m12 to get the second calculation result. Similarly, m21 and m22 can be calculated to obtain the first calculation result and the second calculation result corresponding to the second row region.

According to the first calculation result and the second calculation result obtained by calculating m11 and m12, the row region sampling value corresponding to the first row region is obtained. According to the first calculation result and the second calculation result obtained by calculating m21 and m22, the row region sampling value corresponding to the second row region is obtained.

In step S630, the data on the same bit in the row region sampling value is compared to obtain a comparison result, and the region sampling value of the target region in the first screen is obtained according to the comparison result.

In the embodiment, the same bit refers to using one data bit to compare the data on the same data bit, and obtain the region sampling value of the first screen according to the comparison result.

For example, the row region sampling value B corresponding to the first row region is obtained according to the first calculation result and the second calculation result obtained by calculating m11 and m12, and the row region sampling value C corresponding to the second row region is obtained according to the first calculation result and the second calculation result obtained by calculating m21 and m22.

The data on the same data bits of the row region sampling value B and the row region sampling value C are compared, to determine the region sampling value of the target region S11 shown in FIG. 2 according to the comparison result.

In this exemplary embodiment, the obtained row regions are a preset number of row regions, which reduces the amount of data required to calculate the initial sampling value of the first screen, saves memory space, and in turn reduces the manufacturing cost of the chip used for displaying the target image.

Figure 7:
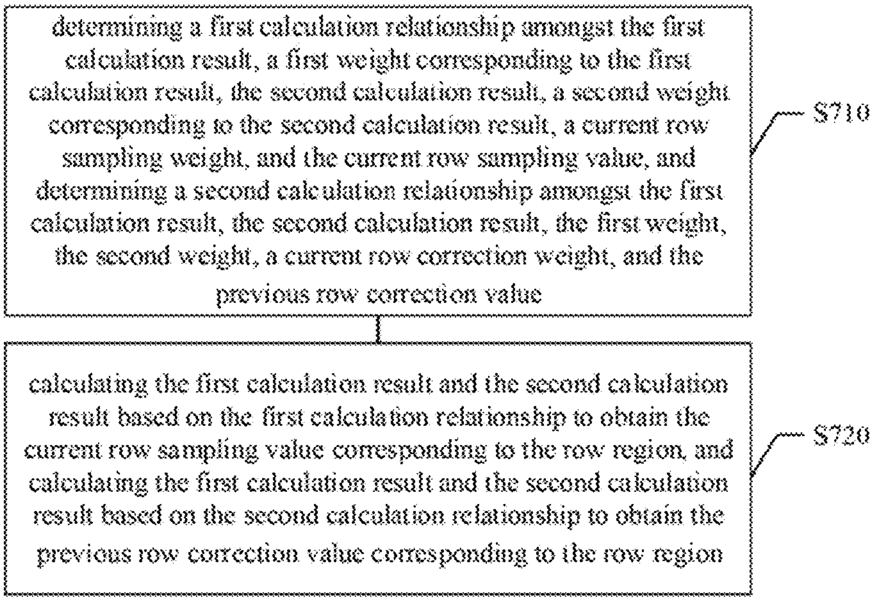
FIG. 7 schematically shows a schematic flowchart of obtaining a current row sampling value in an embodiment of the present disclosure.

In an optional embodiment, FIG. 7 shows a schematic flowchart of obtaining the current row sampling value in the image display method. As shown in FIG. 7, the method includes at least the following steps: in step S710, determining the first calculation relationship amongst the first calculation result, the first weight corresponding to the first calculation result, the second calculation result, the second weight corresponding to the second calculation result, the current row sampling weight, and the current row sampling value, and determining the second calculation relationship amongst the first calculation result, the second calculation result, the first weight, the second weight, the current row correction weight, and the previous row correction value.

The first weight is the weight assigned to the first calculation result and affects the current row sampling value. Similarly, the second weight is the weight assigned to the second calculation result and affects the previous row correction value. The current row sampling weight is a weighted value, and correspondingly, the current row correction weight is also a weighted value.

The first calculation relationship is a calculation relationship formula amongst the first calculation result, the first weight, the second calculation result, the second weight, the current row sampling weight and the current row sampling value. Correspondingly, the second calculation relationship is a calculation relationship formula amongst the first calculation result, the first weight, the second calculation result, the second weight, the current row correction weight and the previous row correction value.

For example, the first calculation relationship is shown as formula (1).

$$VLX1=(K\_L1\times(K_{V_{max}}\times n_{max}+(1-K_{V_{max}})\times n_{mean})) \quad (1)$$

In formula (1), $n_{max}$ is the first calculation result, $n_{mean}$ is the second calculation result. $K_{V_{max}}$ is the first weight, $1-K_{V_{max}}$ is the second weight, K_L1 is the current row sampling weight, VLX1 is the current row sampling value.

the second calculation relationship is shown as formula (2).

$$VLF1=(K\_X1\times(K_{V_{max}}+(1-K_{V_{max}})\times n_{mean})) \quad (2)$$

In formula (2), $n_{max}$ is the first calculation result, $n_{mean}$ is the second calculation result, $K_{V_{max}}$ is the first weight, $1-K_{V_{max}}$ is the second weight, K_X1 is the current row correction weight, VLF1 is the previous row correction value.

In step S720, based on the first calculation relationship, the first calculation result and the second calculation result are calculated to obtain the current row sampling value corresponding to the row region, and the first calculation result and the second calculation result are calculated based on the second calculation relationship to obtain the previous row correction value corresponding to the row region.

The current row sampling value can be obtained according to the first calculation relationship, and the previous row correction value can be obtained according to the second calculation relationship.

For example, using formula (1), the current row sampling value can be obtained, and similarly, using formula (2), the previous row correction value can be obtained.

In the present exemplary embodiment, the first calculation relationship and the second calculation relationship include the first weight and the second weight. Through different configurations of the first weight and the second weight, different current row sampling values and previous row correction values can be obtained. In turn, different effects are produced on the effect of the subsequent display of the target images. According to different application scenarios, the first weight and the second weight can be flexibly adjusted, thereby helping to subsequently display a target image that meets the requirements of the scenario.

Figure 8:
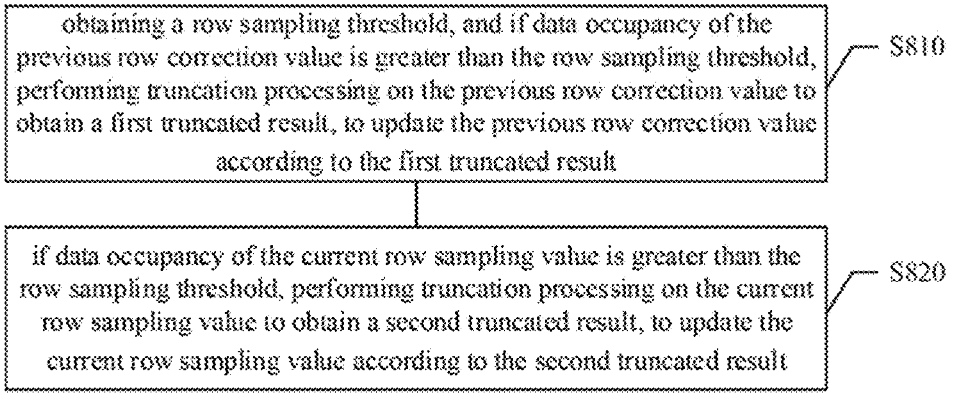
FIG. 8 schematically shows a schematic flowchart of updating the current row sampling value in an embodiment of the present disclosure.

In an optional embodiment, FIG. 8 shows a schematic flowchart of updating the current row sampling value in the image display method. As shown in FIG. 8, the method at least includes the following steps: in step S810, obtaining a row sampling threshold, and if the data occupancy of the previous row correction value is greater than the row sampling threshold, the previous row correction value is truncated to obtain a first truncated result, to update the previous row correction value according to the first truncation result.

The sampling threshold is a value used to limit the data occupancy of the previous row correction value and the current row sampling value. For example, when the threshold for limiting the data occupancy of the previous row correction value and the current row sampling value is 10 bits, the sampling threshold can be 1023 bytes. Based on this, if the previous row correction value is greater than the sampling threshold, it is necessary to truncate the previous row correction value to obtain the first truncated result whose data occupancy is less than the sampling threshold, and update the first truncated result as previous row correction value.

For example, the sampling threshold is 1023. If the data occupancy of the previous row correction value is greater than 1023, the previous row correction value is truncated, and the truncated result, that is, the first truncated result, is updated as the previous row correction value.

In step S820, if the data occupancy of the current row sampling value is greater than the row sampling threshold, truncation processing is performed on the current row sampling value to obtain a second truncated result, so as to update the current row sampling value according to the second truncated result.

If the data occupancy of the current row sampling value is greater than the sampling threshold, the current sampling value also needs to be truncated, and the current row sampling value is updated according to the truncated processing result, that is, the second truncated result.

For example, the sampling threshold is 1023. If the data occupancy of the current sampling value is greater than 1023, the current sampling value is truncated, and the truncated result, that is, the second truncated result, is updated as the current sampling value.

In this exemplary embodiment, the data occupancy of the previous row correction value and the current row sampling value is limited by the sampling threshold, which not only saves memory space, but also saves the manufacturing cost of the chip that subsequently displays the target image.

In an optional embodiment, obtaining the region sampling value of the target region in the first screen according to the comparison result includes: determining the target data corresponding to different bits according to the comparison result, and arranging the target data according to the data positions corresponding to the different bits, to obtain the region sampling value of the target region in the first screen.

The comparison result is the comparison result of the data on the same bit in the row region sampling value, and the target data can be the maximum value in the data on the same bit. After the target data is determined, the target data can be arranged according to the data positions corresponding to different bits, to obtain the region sampling value of the target region in the first screen.

For example, according to the comparison result of data on one bit in row region sampling value B and row region sampling value C, the target data on the same bit is obtained. Specifically, the data on the first bit of the row region sampling value B is 8, and the data on the first bit of the row region sampling value C is 7. If the target data is the maximum value of the data on the same bit, the target data on the first bit is 8. Similarly, the target data on other bits can be determined.

Based on this, the target data is arranged according to the data positions of different bits, and then the region sampling value of the target region in the first screen is obtained.

In step S120, based on the mapping relationship between the previous region correction value and the target region sampling value, the current region sampling value in the target region sampling value is corrected to obtain the first data.

In the exemplary embodiment of the present disclosure, after the region sampling value is determined, since the region sampling value is only determined according to the row image data of a preset number of row regions in the target region, the region sampling value needs to be corrected, to get accurate region sampling value.

The mapping relationship is the relationship between the region correction value in the previous row of a region sampling value and the corrected target region sampling value. Therefore, based on the mapping relationship, the current region sampling value in the target region sampling value can be corrected to obtain the first data displayed on the first screen.

Figure 9:
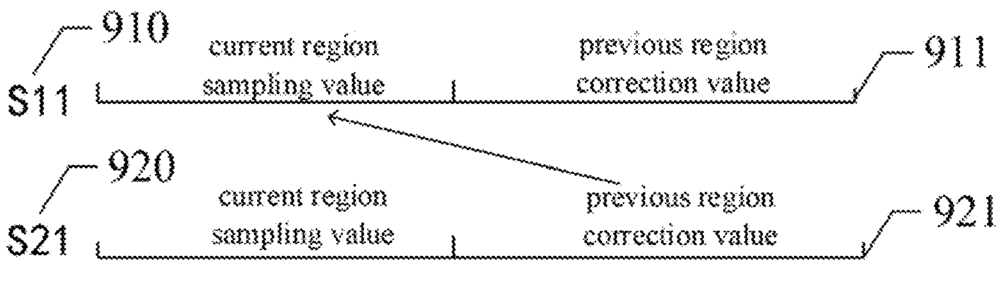
FIG. 9 schematically shows a mapping relationship between different target region sampling values in an embodiment of the present disclosure.

For example, FIG. 9) shows the mapping relationship between sampling values of different target regions. As shown in FIG. 9, the target region 910 is the first target region S11 in the first screen, and the target region 920 is the second target region S21 in the first screen. The data 911 is the region sampling value corresponding to the target region 910, and the data 921 is the region sampling value corresponding to the target region 920. The arrow is the mapping relation between the previous region correction value in the data 921 and the target region sampling value 911.

Based on this mapping relationship, the current region sampling value in the target region sampling value 911 is corrected, and similarly, the first data is obtained after other target region sampling values are also corrected.

Figure 10:
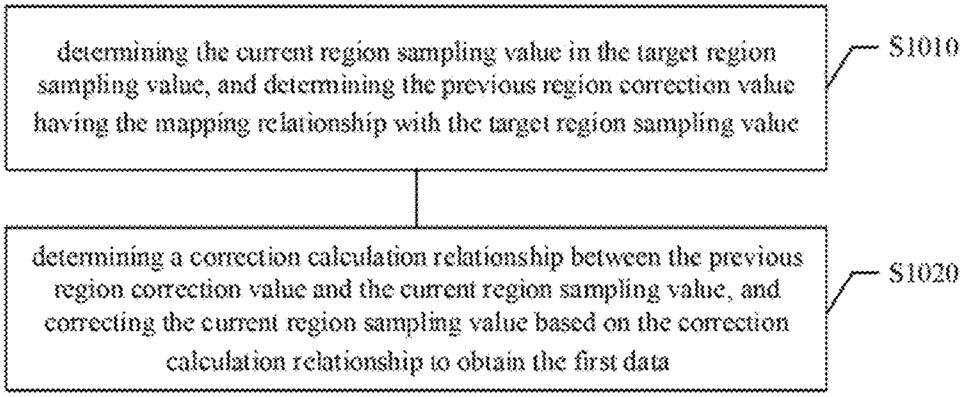
FIG. 10 schematically shows a schematic flowchart of obtaining the first data in an embodiment of the present disclosure.

In an optional embodiment, FIG. 10 shows a schematic flowchart of obtaining the first data in the image display method. As shown in FIG. 10, the method at least includes the following steps: in step S1010, the target region sampling value in the current region sampling value is determined, and the previous region correction value having the mapping relationship with the target region sampling value is determined.

When correcting the sampling value of the target region, it is necessary to first determine the current region sampling value in the sampling value of the target region, and then determine the previous region correction value for correcting the current region sampling value according to the mapping relationship.

For example, if the sampled value of the target region is the data 911 shown in FIG. 9, it is determined that the previous region correction value that has a mapping relationship with the sampled value of the target region 911 is the previous region correction value in the data 921 shown in FIG. 9.

In step S1020, a correction calculation relationship between the previous region correction value and the current region sampling value is determined, and based on the correction calculation relationship, the current region sampling value is corrected to obtain first data.

The correction calculation relationship is a calculation relationship between the previous region correction value and the current region sampling value. According to the calculation relationship, the current region sampling value is corrected to obtain the first data.

For example, the corrected calculation relationship is shown in formula (3).

$$K_{pixel}=K_{XS}\times LSB+(1-K_{XS})\times MSB \tag{3}$$

In formula (3), $K_{XS}$ is the weight assigned to the previous region correction value, LSB is the previous region correction value, and MSB is the current region sampling value in the target region sampling value.

Based on the formula (3), Kpixel can be updated to the current region sampling value in the target region sampling value, so as to realize the correction of the current sampling value of the target region.

In this exemplary embodiment, by correcting the sampling value of the target region, the accurate first data displayed on the first screen can be obtained on the basis of only obtaining the image data of a preset number of row regions. That is, the accuracy of the first data is ensured, the problem of jaggedness of the target image in the prior art is solved in the process of overlapping screen display, the memory is reduced, and the manufacturing cost of the chip for displaying the target image is reduced.

Figure 11:
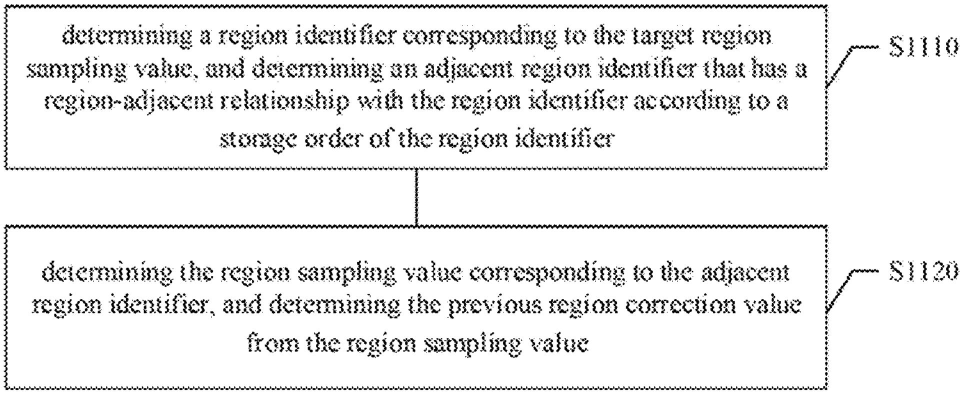
FIG. 11 schematically shows a schematic flowchart of determining the previous region correction value that has a mapping relationship with the target region sampling value in an embodiment of the present disclosure.

In an optional embodiment, FIG. 11 shows a schematic flowchart of determining the previous region correction value that has a mapping relationship with the target region sampling value in the image display method. As shown in FIG. 11, the method includes at least the following steps: in step S1110, a region identifier corresponding to the target region sampling value is determined, and an adjacent region identifier having a region-adjacent relationship with the region identifier is determined according to the storage order of the region identifiers.

The region identifier is the information that can distinguish different target regions. When a region sampling value is determined, the region sampling value will be stored, and the region identifier corresponding to the region sampling value will be stored accordingly. Therefore, the adjacent region identifier of the region identifier can be determined according to the storage order.

For example, the region identifier of the target region sampling value B is S11. According to the storage order of the region identifiers, it can be obtained that the adjacent region identifier of the region identifier S11 is S21.

In step S1120, the region sampling value corresponding to the adjacent region identifier is determined, and the previous region correction value is determined from the region sampling value.

The region sampling value corresponding to the adjacent region identifier is determined. At this time, the previous region correction value in the region sampling value is the value for correcting the current region sampling value in the target region sampling value.

For example, as shown in FIG. 9, the region sampling value corresponding to the adjacent region identifier S21 is the data 921, and the previous region correction value in the data 921 is the value for correcting the current region sampling value in the data 911.

In this exemplary embodiment, determining the previous region correction value for correcting the current region sampling value of the target region can ensure the accuracy of the first data on the basis of only acquiring a preset number of rows of image data, which solves the problem of existing problems that aliasing occurs when the target image is displayed on the stacked screen, reduces the memory and thus reduces the manufacturing cost of the chip for displaying the target image.

In step S130, the second data corresponding to the second screen is determined according to the first data, so as to realize the display of the target image in the stacked screen according to the first data and the second data. The first screen and the second screen form the stacked screen in an overlapped manner.

In the exemplary embodiment of the present disclosure, after the first data is determined, a convolution operation needs to be performed on the first data, and then the noise of the target image is suppressed under the condition that the detail features of the target image are preserved as much as possible.

After the convolution operation, the second data corresponding to the second screen is determined according to the first data after the convolution operation. Specifically, for example for the point 31 in FIG. 2, when determining the second data at point 31 on the second screen, the region sampling value of target region S11 where point 31 is located and the region sampling value of target region S21 where point 31 is located need to be obtained first. Then, the overlapping area of the target region S11 and the target region S21 is determined, that is, the area of the region formed by the point 31 and the point 32. Then the grayscale value of the target image at point 31 is obtained, and finally the second data at the point 31 is determined by combining the region sampling value of target region S11, the region sampling value of target region S21, the overlapping area of target region S11 and target region S21, the grayscale value of the target image at point 31, and the optical capability of the display. Similarly, the second data of other points in FIG. 2 can be determined.

Based on this, according to the corresponding relationship between the first data and the first screen, and the corresponding relationship between the second data and the second screen, the display of the target image in the stacked screen is realized.

In this exemplary embodiment, the first data is the first data obtained after correction, which ensures the accuracy of the first data, thereby improves the accuracy of the second data, and avoids the problem in the prior art that aliasing occurs during the display of the target image on the stacked screen. Based on this, since the second data is determined according to the first data, the accuracy of the second data is also improved, and the display of the target object on the stacked screen is finally improved. This improves the user's experience of viewing the target image.

In the method and device provided by the exemplary embodiments of the present disclosure, according to the mapping relationship between the previous region correction value and the target region sampling value, the current region sampling value in the target region sampling value is corrected, avoiding the problem existing in the related art that due to the irregular distribution of pixels on the first screen, the image edge appears jagged during the image display process, which improves the image display effect and further improves the user's experience of viewing the image.

Hereinafter, the picture display method in the embodiment of the present disclosure is described in detail with reference to an application scenario.

Figure 12:
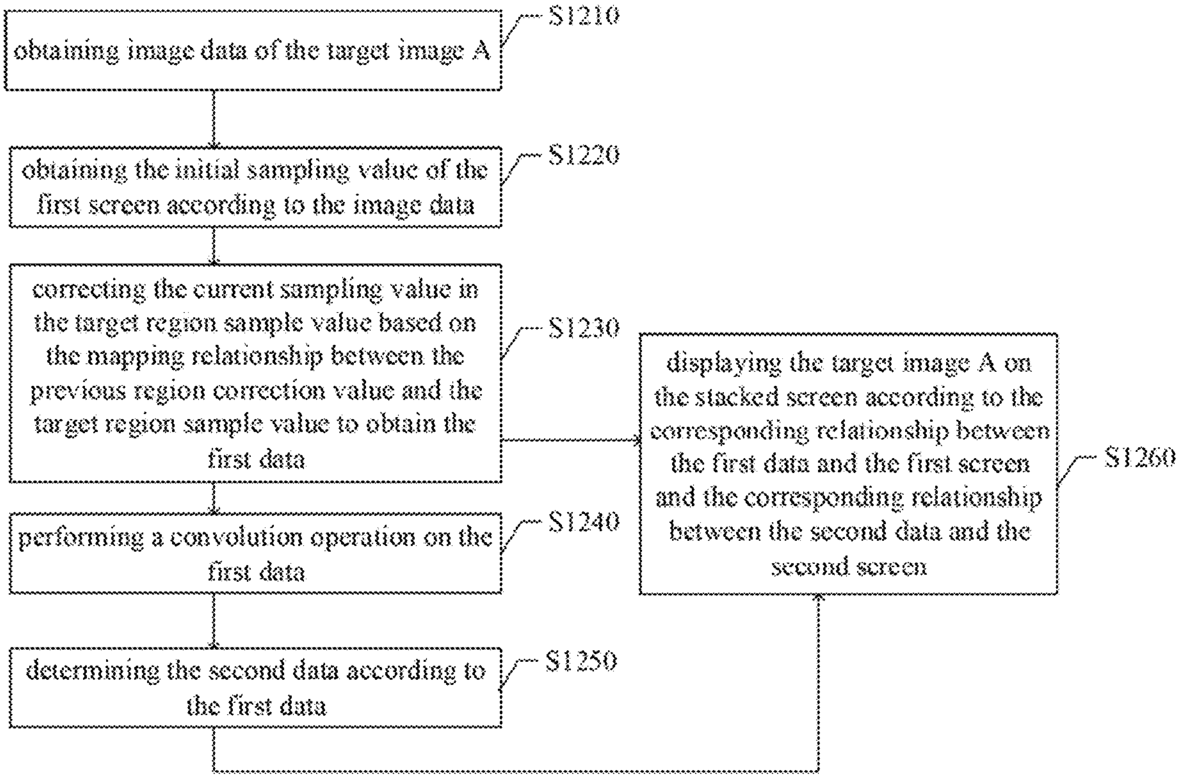
FIG. 12 shows a schematic flowchart of an embodiment of the present disclosure in an application scenario.

FIG. 12 shows a schematic flowchart of an embodiment of the present disclosure in an application scenario. As shown in FIG. 12, step S1210 is a process of obtaining image data of the target image A. Step S1220 is a process of obtaining the initial sampling value of the first screen according to the image data, and the initial sampling value includes the previous region correction value and the current region sampling value. Step S1230 is a process of correcting the current sampling value in the target region sampling value based on the mapping relationship between the previous region correction value and the target region sampling value to obtain the first data. Step S1240 is a process of performing a convolution operation on the first data. Step S1250 is a process of determining the second data according to the first data. Step S1260 is a process of displaying the target image A on the stacked screen according to the corresponding relationship between the first data and the first screen and the corresponding relationship between the second data and the second screen.

In this application scenario, according to the mapping relationship between the previous region correction value and the target region sampling value, the current region sampling value in the target region sampling value is corrected, avoiding the problem existing in the related art that due to the irregular distribution of pixels on the first screen, the image edge appears jagged during the image display process, which improves the image display effect and further improves the user's experience of viewing the image.

Figure 13:
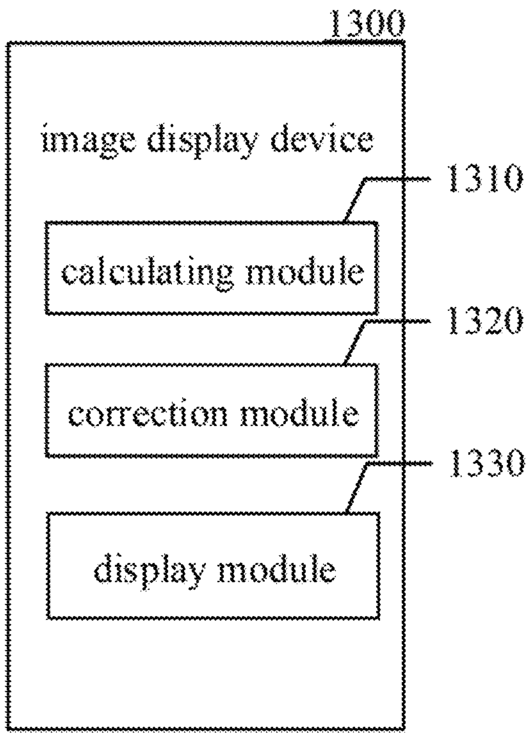
FIG. 13 schematically shows a schematic structural diagram of an image display device in an embodiment of the present disclosure.

In addition, in an exemplary embodiment of the present disclosure, an image display device is also provided. FIG. 13 shows a schematic structural diagram of an image display device. As shown in FIG. 13, the image display device 1300 may include: a calculation module 1310, a correction module 1320 and a display module 1330.

The calculating module 1310 is configured to obtain image data of a target image, and obtain an initial sampling value of a first screen according to the image data, wherein the initial sampling value comprises region sampling values of at least two target regions in the first screen, and the region sampling values comprise a previous region correction value and a current region sampling value; the correction module 1320 is configured to correct the current region sampling value in a target region sampling value, based on a mapping relationship between the previous region correction value and the target region sampling value, to obtain first data; and the displaying module 1330 is configured to determine second data corresponding to a second screen according to the first data, to realize displaying of the target image in a stacked screen by displaying the first data on the first screen and displaying the second data in the second screen, wherein the stacked screen is formed by the first screen and the second screen in an overlapped manner.

The specific details of the above-mentioned image display device 1300 have been described in detail in the corresponding image display method, and thus are not repeated here.

It should be noted that although several modules or units of the image display device 1300 are mentioned in the above detailed description, such division is not mandatory. Indeed, according to embodiments of the present disclosure, the features and functions of two or more modules or units described above may be embodied in one module or unit. Conversely, the features and functions of one module or unit described above may be further divided into multiple modules or units to be embodied.

In addition, in an exemplary embodiment of the present disclosure, an electronic device capable of implementing the above method is also provided.

An electronic device 1400 according to such an embodiment of the present invention is described below with reference to FIG. 14. The electronic device 1400 shown in FIG. 14 is only an example, and should not impose any limitation on the function and scope of use of the embodiments of the present invention.

Figure 14:
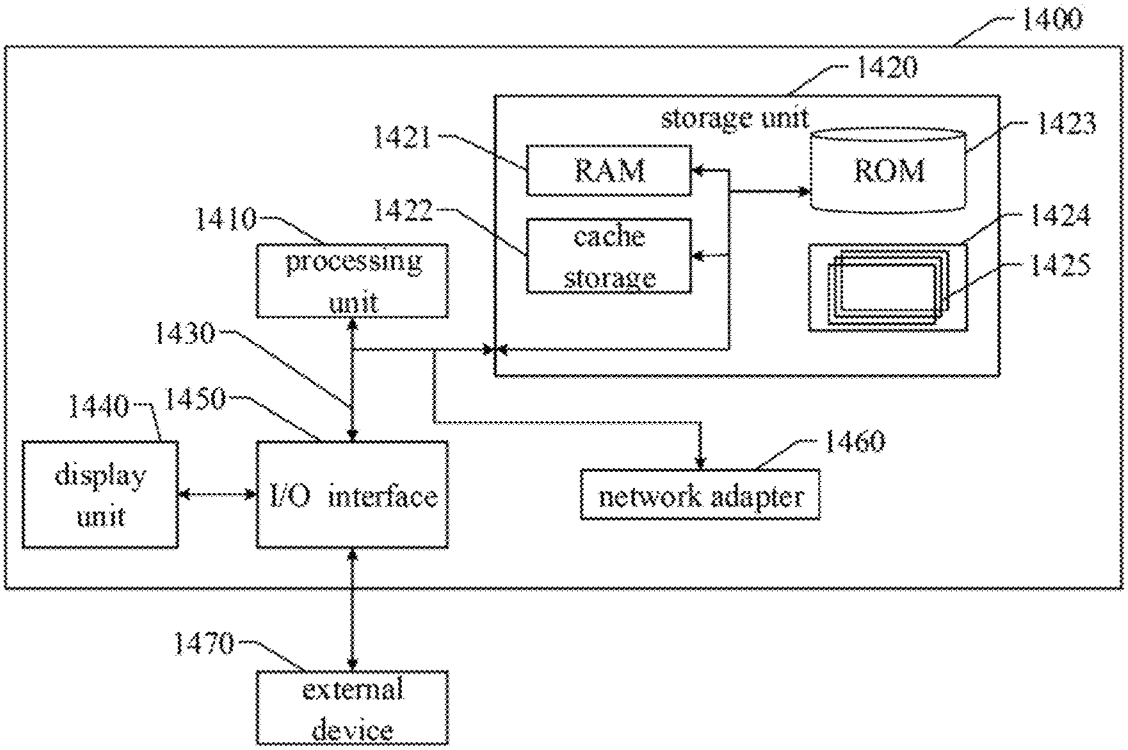
FIG. 14 schematically shows an electronic device for the image display method in an embodiment of the present disclosure.

As shown in FIG. 14, electronic device 1400 takes the form of a general-purpose computing device. Components of the electronic device 1400 may include, but are not limited to: the above-mentioned at least one processing unit 1410, the above-mentioned at least one storage unit 1420, a bus 1430 connecting different system components (including the storage unit 1420 and the processing unit 1410), and a display unit 1440.

The storage unit stores program codes that can be executed by the processing unit 1410 to cause the processing unit 1410 to perform steps of various exemplary embodiments according to the present invention described in the above "DETAILED DESCRIPTION" section of this specification.

The storage unit 1420 may include a readable medium in the form of a volatile storage unit, such as a random access storage unit (RAM) 1421 and/or a cache storage unit 1422, and may further include a read only storage unit (ROM) 1423.

The storage unit 1420 may also include a program/utility tool 1424 having a set (at least one) of program modules 1425, such program modules 1425 including, but not limited to: an operating system, one or more application programs, other program modules, and program data, each or some combination of these examples may contain the reality of the network environment.

The bus 1430 may be representative of one or more of several types of bus structures, including a memory cell bus or memory cell controller, a peripheral bus, a accelerated graphics port, a processing unit, or a local area bus using any of a variety of bus structures.

The electronic device 1400 may also communicate with one or more external devices 1470 (e.g., keyboards, pointing devices, Bluetooth devices, etc.), with one or more devices that enable a user to interact with the electronic device 1400, and/or with any device (e.g., router, modem, etc.) that enables the electronic device 1400 to communicate with one or more other computing devices. Such communication may be implemented through input/output (I/O) interface 1450.

Also, the electronic device 1400 may communicate with one or more networks (e.g., a local area network (LAN), a wide area network (WAN), and/or a public network such as the Internet) through a network adapter 1460. As shown in the drawings, the network adapter 1460 communicates with other modules of electronic device 1400 via bus 1430. It should be appreciated that, although not shown, other hardware and/or software modules may be used in conjunction with electronic device 1400, including but not limited to: microcode, device drivers, redundant processing units, external disk drive arrays, RAID systems, tape drives and data backup storage systems.

From the description of the above embodiments, those skilled in the art can easily understand that the exemplary embodiments described herein may be implemented by software, or may be implemented by software combined with necessary hardware. Therefore, the technical solutions according to the embodiments of the present disclosure may be embodied in the form of software products, and the software products may be stored in a non-volatile storage medium (which may be CD-ROM, U disk, mobile hard disk, etc.) or on the network, including several instructions to cause a computing device (which may be a personal computer, a server, a terminal device, or a network device, etc.) to execute the method according to an embodiment of the present disclosure.

In an exemplary embodiment of the present disclosure, there is also provided a computer-readable storage medium on which a program product capable of implementing the above-described method of the present specification is stored. In some possible embodiments, aspects of the present invention may also be implemented in the form of a program product comprising program code, and when the program product is executed on a terminal device, the program code is used to cause the terminal device to perform the steps according to various exemplary embodiments of the present invention described in the "DETAILED DESCRIPTION" section above in this specification.

Figure 15:
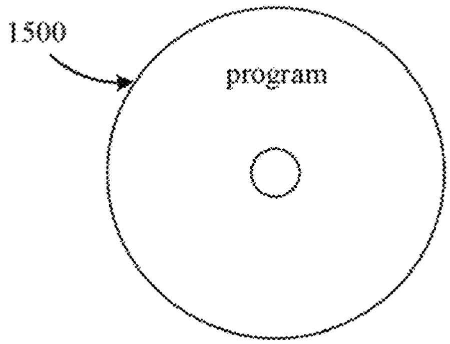
FIG. 15 schematically illustrates a computer-readable storage medium for the image display method in an embodiment of the present disclosure.

Referring to FIG. 15, a program product 1500 for implementing the above method according to an embodiment of the present invention is described, which can adopt a portable compact disk read only memory (CD-ROM) and include program codes, and can be executed on a terminal device such as a personal computer. However, the program product of the present invention is not limited thereto, and in this document, a readable storage medium may be any tangible medium that contains or stores a program that can be used by or in conjunction with an instruction execution system, apparatus, or device.

The program product may employ any combination of one or more readable media. The readable medium may be a readable signal medium or a readable storage medium. The readable storage medium may be, for example, but not limited to, an electrical, magnetic, optical, electromagnetic, infrared, or semiconductor system, apparatus or device, or a combination of any of the above. More specific examples (non-exhaustive list) of readable storage media include: electrical connections with one or more wires, portable disks, hard disks, random access memory (RAM), read only memory (ROM), erasable programmable read only memory (EPROM or flash memory), optical fiber, portable compact disk read only memory (CD-ROM), optical storage devices, magnetic storage devices, or any suitable combination of the foregoing.

A computer readable signal medium may include a propagated data signal in baseband or as part of a carrier wave with readable program code embodied thereon. Such propagated data signals may take a variety of forms, including but not limited to electromagnetic signals, optical signals, or any suitable combination of the foregoing. A readable signal medium can also be any readable medium, other than the readable storage medium, that can transmit, propagate, or transport the program for use by or in connection with the instruction execution system, apparatus, or device.

Program code embodied on a readable medium may be transmitted using any suitable medium, including but not limited to wireless, wireline, optical fiber cable, RF, etc., or any suitable combination of the foregoing.

Program code for carrying out operations of the present invention may be written in any combination of one or more programming languages, including object-oriented programming languages—such as Java, C++, etc., as well as conventional procedural programming language—such as the "C" language or similar programming language. The program code may execute entirely on the user computing device, partly on the user device, as a stand-alone software package, partly on the user computing device and partly on a remote computing device, or entirely on the remote computing device or server. Where remote computing devices are involved, the remote computing devices may be connected to the user computing device over any kind of network, including a local area network (LAN) or wide area network (WAN), or may be connected to an external computing device (e.g., connecting through the Internet using an Internet service provider).

Other embodiments of the present disclosure will readily suggest themselves to those skilled in the art upon consideration of the specification and practice of the invention disclosed herein. This application is intended to cover any variations, uses, or adaptations of the present disclosure that follow the general principles of the present disclosure and include common knowledge or techniques in the technical field not disclosed by the present disclosure. The specification and examples are to be regarded as exemplary only, with the true scope and spirit of the disclosure being indicated by the claims.

What is claimed is:

1. An image display method, comprising:

obtaining image data of a target image, and obtaining an initial sampling value of a first screen according to the image data, wherein the initial sampling value comprises region sampling values of at least two target regions in the first screen, and each region sampling value comprises a previous region correction value and a current region sampling value;

correcting the current region sampling value in a target region sampling value, based on a mapping relationship between the previous region correction value and the target region sampling value, to obtain first data; and determining second data corresponding to a second screen according to the first data, to realize displaying of the target image in a stacked screen according to the first data and the second data, wherein the stacked screen is formed by the first screen and the second screen in an overlapped manner.

2. The image display method according to claim 1, wherein the target region comprises at least two row regions, and the obtaining the initial sampling value of the first screen according to the image data comprises:

determining row image data corresponding to a preset number of the row regions from the image data, and calculating the row image data to obtain a first calculation result and a second calculation result;

obtaining a previous row correction value corresponding to each row region and a current row sampling value corresponding to each row region according to the first calculation result and the second calculation result, wherein a row region sampling value is formed by the previous row correction value and the current row sampling value; and comparing data on a same bit of the row region sampling value to obtain a comparison result, and obtaining the region sampling value of the target region in the first screen according to the comparison result.

3. The image display method according to claim 2, wherein the obtaining the previous row correction value corresponding to the row region and the current row sampling value corresponding to the row region according to the first calculation result and the second calculation result comprises:

determining a first calculation relationship amongst the first calculation result, a first weight corresponding to the first calculation result, the second calculation result, a second weight corresponding to the second calculation result, a current row sampling weight, and the current row sampling value, and determining a second calculation relationship amongst the first calculation result, the second calculation result, the first weight, the second weight, a current row correction weight, and the previous row correction value; and calculating the first calculation result and the second calculation result based on the first calculation relationship to obtain the current row sampling value corresponding to the row region, and calculating the first calculation result and the second calculation result based on the second calculation relationship to obtain the previous row correction value corresponding to the row region.

4. The image display method according to claim 3, further comprising:

obtaining a row sampling threshold, and if data occupancy of the previous row correction value is greater than the row sampling threshold, performing truncation processing on the previous row correction value to obtain a first truncated result, to update the previous row correction value according to the first truncated result; and if data occupancy of the current row sampling value is greater than the row sampling threshold, performing truncation processing on the current row sampling value to obtain a second truncated result, to update the current row sampling value according to the second truncated result.

5. The image display method according to claim 4, wherein the correcting the current region sampling value in the target region sampling value to obtain the first data comprises:

determining the current region sampling value in the target region sampling value, and determining the previous region correction value having the mapping relationship with the target region sampling value; and determining a correction calculation relationship between the previous region correction value and the current region sampling value, and correcting the current region sampling value based on the correction calculation relationship to obtain the first data.

6. The image display method according to claim 5, wherein the determining the previous region correction value having the mapping relationship with the target region sampling value comprises:

determining a region identifier corresponding to the target region sampling value, and determining an adjacent region identifier that has a region-adjacent relationship with the region identifier according to a storage order of the region identifier; and determining the region sampling value corresponding to the adjacent region identifier, and determining the previous region correction value from the region sampling value.

7. The image display method according to claim 2, wherein the obtaining the region sampling value of the target region in the first screen according to the comparison result comprises:

determining target data corresponding to different bits according to the comparison result, and arranging the target data according to data positions corresponding to the different bits to obtain the region sampling value of the target region in the first screen.

8. An electronic device, comprising:

a processor; and a non-volatile memory configured to store executable instructions for the processor, wherein the processor is configured to execute the executable instructions to perform:

obtaining image data of a target image, and obtaining an initial sampling value of a first screen according to the image data, wherein the initial sampling value comprises region sampling values of at least two target regions in the first screen, and each region sampling value comprises a previous region correction value and a current region sampling value;

correcting the current region sampling value in a target region sampling value, based on a mapping relationship between the previous region correction value and the target region sampling value, to obtain first data; and determining second data corresponding to a second screen according to the first data, to realize displaying of the target image in a stacked screen according to the first data and the second data, wherein the stacked screen is formed by the first screen and the second screen in an overlapped manner.

9. The electronic device according to claim 8, wherein the target region comprises at least two row regions, and the processor is further caused to perform:

determining row image data corresponding to a preset number of the row regions from the image data, and calculating the row image data to obtain a first calculation result and a second calculation result;

obtaining a previous row correction value corresponding to each row region and a current row sampling value corresponding to each row region according to the first calculation result and the second calculation result, wherein a row region sampling value is formed by the previous row correction value and the current row sampling value; and comparing data on a same bit of the row region sampling value to obtain a comparison result, and obtaining the region sampling value of the target region in the first screen according to the comparison result.

10. The electronic device according to claim 9, wherein the processor is further caused to perform:

determining a first calculation relationship amongst the first calculation result, a first weight corresponding to the first calculation result, the second calculation result, a second weight corresponding to the second calculation result, a current row sampling weight, and the current row sampling value, and determining a second calculation relationship amongst the first calculation result, the second calculation result, the first weight, the second weight, a current row correction weight, and the previous row correction value; and calculating the first calculation result and the second calculation result based on the first calculation relationship to obtain the current row sampling value corresponding to the row region, and calculating the first calculation result and the second calculation result based on the second calculation relationship to obtain the previous row correction value corresponding to the row region.

11. The electronic device according to claim 10, wherein the processor is further caused to perform:

obtaining a row sampling threshold, and if data occupancy of the previous row correction value is greater than the row sampling threshold, performing truncation processing on the previous row correction value to obtain a first truncated result, to update the previous row correction value according to the first truncated result; and if data occupancy of the current row sampling value is greater than the row sampling threshold, performing truncation processing on the current row sampling value to obtain a second truncated result, to update the current row sampling value according to the second truncated result.

12. The electronic device according to claim 11, wherein the processor is further caused to perform:

determining the current region sampling value in the target region sampling value, and determining the previous region correction value having the mapping relationship with the target region sampling value; and determining a correction calculation relationship between the previous region correction value and the current region sampling value, and correcting the current region sampling value based on the correction calculation relationship to obtain the first data.

13. The electronic device according to claim 12, wherein the processor is further caused to perform:

determining a region identifier corresponding to the target region sampling value, and determining an adjacent region identifier that has a region-adjacent relationship with the region identifier according to a storage order of the region identifier; and determining the region sampling value corresponding to the adjacent region identifier, and determining the previous region correction value from the region sampling value.

14. The electronic device according to claim 9, wherein the processor is further caused to perform:

determining target data corresponding to different bits according to the comparison result, and arranging the target data according to data positions corresponding to the different bits to obtain the region sampling value of the target region in the first screen.

15. A non-volatile computer-readable storage medium on which a computer program is stored, wherein when the computer program is executed by a processor, the execution causes the processor to perform:

obtaining image data of a target image, and obtaining an initial sampling value of a first screen according to the image data, wherein the initial sampling value comprises region sampling values of at least two target regions in the first screen, and each region sampling value comprises a previous region correction value and a current region sampling value;

correcting the current region sampling value in a target region sampling value, based on a mapping relationship between the previous region correction value and the target region sampling value, to obtain first data; and determining second data corresponding to a second screen according to the first data, to realize displaying of the target image in a stacked screen according to the first data and the second data, wherein the stacked screen is formed by the first screen and the second screen in an overlapped manner.

16. The storage medium according to claim 15, wherein the target region comprises at least two row regions, and the processor is further caused to perform:

determining row image data corresponding to a preset number of the row regions from the image data, and calculating the row image data to obtain a first calculation result and a second calculation result;

obtaining a previous row correction value corresponding to each row region and a current row sampling value corresponding to each row region according to the first calculation result and the second calculation result, wherein a row region sampling value is formed by the previous row correction value and the current row sampling value; and comparing data on a same bit of the row region sampling value to obtain a comparison result, and obtaining the region sampling value of the target region in the first screen according to the comparison result.

17. The storage medium according to claim 16, wherein the processor is further caused to perform:

determining a first calculation relationship amongst the first calculation result, a first weight corresponding to the first calculation result, the second calculation result, a second weight corresponding to the second calculation result, a current row sampling weight, and the current row sampling value, and determining a second calculation relationship amongst the first calculation result, the second calculation result, the first weight, the second weight, a current row correction weight, and the previous row correction value; and calculating the first calculation result and the second calculation result based on the first calculation relationship to obtain the current row sampling value corresponding to the row region, and calculating the first calculation result and the second calculation result based on the second calculation relationship to obtain the previous row correction value corresponding to the row region.

18. The storage medium according to claim 17, wherein the processor is further caused to perform:

obtaining a row sampling threshold, and if data occupancy of the previous row correction value is greater than the row sampling threshold, performing truncation processing on the previous row correction value to obtain a first truncated result, to update the previous row correction value according to the first truncated result; and if data occupancy of the current row sampling value is greater than the row sampling threshold, performing truncation processing on the current row sampling value to obtain a second truncated result, to update the current row sampling value according to the second truncated result.

19. The storage medium according to claim 18, wherein the processor is further caused to perform:

determining the current region sampling value in the target region sampling value, and determining the previous region correction value having the mapping relationship with the target region sampling value; and determining a correction calculation relationship between the previous region correction value and the current region sampling value, and correcting the current region sampling value based on the correction calculation relationship to obtain the first data.

20. The storage medium according to claim 19, wherein the processor is further caused to perform:

determining a region identifier corresponding to the target region sampling value, and determining an adjacent region identifier that has a region-adjacent relationship with the region identifier according to a storage order of the region identifier, and determining the region sampling value corresponding to the adjacent region identifier, and determining the previous region correction value from the region sampling value.

* * * * *